(12) United States Patent
Suzuki et al.

(10) Patent No.: US 11,639,087 B2
(45) Date of Patent: May 2, 2023

(54) AUTOMOBILE DOOR

(71) Applicant: NIPPON STEEL CORPORATION, Tokyo (JP)

(72) Inventors: Toshiya Suzuki, Tokyo (JP); Satoshi Hirose, Tokyo (JP); Tohru Yoshida, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 116 days.

(21) Appl. No.: 17/422,318

(22) PCT Filed: Jan. 15, 2020

(86) PCT No.: PCT/JP2020/001074
§ 371 (c)(1),
(2) Date: Jul. 12, 2021

(87) PCT Pub. No.: WO2020/149305
PCT Pub. Date: Jul. 23, 2020

(65) Prior Publication Data
US 2022/0097497 A1    Mar. 31, 2022

(30) Foreign Application Priority Data

Jan. 15, 2019 (JP) .............................. JP2019-004038

(51) Int. Cl.
*B60J 5/04* (2006.01)
(52) U.S. Cl.
CPC ........... *B60J 5/0427* (2013.01); *B60J 5/0411* (2013.01); *B60J 5/0412* (2013.01); *B60J 5/0426* (2013.01); *B60J 5/0441* (2013.01)

(58) Field of Classification Search
CPC ...... B60J 5/0427; B60J 5/0411; B60J 5/0412; B60J 5/0426; B60J 5/0441
See application file for complete search history.

(56) References Cited

U.S. PATENT DOCUMENTS 6,056,349 A * 5/2000 Seksaria .................. B60J 5/045
428/902
6,302,474 B1 * 10/2001 Drysdale ................ B60J 5/0441
296/5

(Continued)

FOREIGN PATENT DOCUMENTS

CN           204432328 U    7/2015
JP         2003-205741 A    7/2003

(Continued)

*Primary Examiner* — Joseph D. Pape
(74) *Attorney, Agent, or Firm* — Birch, Stewart, Kolasch & Birch, LLP (57) ABSTRACT

Provided is an automobile door (600) including: a first impact absorbing member (122) that traverses the automobile door (600) so as to extend between both end portion regions in a vehicle height direction; a second impact absorbing member (124) that traverses the automobile door (600) so as to extend between both end portion regions in a vehicle length direction; an exterior material (110); and a belt line reinforcement (300), in which bending rigidity in a vehicle width direction of a cross section perpendicular to an extending direction of the belt line reinforcement (300) at a support portion is larger than bending rigidity in the vehicle width direction of a cross section perpendicular to an extending direction of the first impact absorbing member (122) at an intersection portion.

6 Claims, 8 Drawing Sheets

(56) References Cited

U.S. PATENT DOCUMENTS

2017/0129314 A1 5/2017 Sawa et al.
2019/0168587 A1 6/2019 Suzuki et al.

FOREIGN PATENT DOCUMENTS

| JP | 2018-52140 A | 4/2018 |
| WO | WO 2016/001966 A1 | 1/2016 |
| WO | WO 2018/021422 A1 | 2/2018 |

* cited by examiner

FIG. 10

AUTOMOBILE DOOR

TECHNICAL FIELD OF THE INVENTION

The present invention relates to an automobile door.

This application claims the right of priority based on Japanese Patent Application No. 2019-004038 filed with the Japan Patent Office on Jan. 15, 2019, the content of which is incorporated herein by reference.

BACKGROUND ART

As the related art, for example, Patent Document 1 described below discloses a technique assumed to provide a door structure for an automobile, in which it is possible to achieve vibration suppression with a high level and panel stiffness improvement of a door outer panel while suppressing a weight increase and a cost increase.

PRIOR ART DOCUMENT

Patent Document

[Patent Document 1] Japanese Unexamined Patent Application, First Publication No. 2003-205741

DISCLOSURE OF THE INVENTION

Problems to be Solved by the Invention

In the technique disclosed in Patent Document 1 above, one strut extending in a vehicle height direction of the door and a door outer waist reinforcement and a guard bar extending in a vehicle length direction of the door are provided. Of these, the strut extending in the vehicle height direction of the door is provided to improve the panel stiffness of the panel, and the guard bar extending in the vehicle length direction is responsible for absorbing an impact due to a collision.

However, an impact absorbing member such as the guard bar is installed so as to traverse the door. The end portions of the impact absorbing member are fixed, and the impact absorbing member absorbs an impact by being bent on the center side rather than the fixed portions. However, the inventors of the present invention have found that if the impact absorbing member is easily bent, there is a problem that the performance of the impact absorbing member cannot be fully exhibited.

Further, since the strut provided by only one is provided to improve the panel stiffness, it is not possible to absorb an impact around the strut. Further, the inventors of the present invention have found that in order to absorb an impact, it is necessary to provide a strong guard bar, which causes a problem of increasing the weight of the door.

Therefore, the present invention has been made in view of the above problems, and an object of the present invention is to provide a new and improved automobile door capable of more reliably absorbing an impact.

Means for Solving the Problem (1) According to an aspect of the present invention, there is provided an automobile door including: a first impact absorbing member that traverses the automobile door so as to extend between both end portion regions in a vehicle height direction; a second impact absorbing member that traverses the automobile door so as to extend between both end portion regions in a vehicle length direction; an exterior material; and a belt line reinforcement, in which the second impact absorbing member is adjacent to the exterior material, the first impact absorbing member and the second impact absorbing member intersect with each other at an intersection portion, the first impact absorbing member and the second impact absorbing member are in contact with each other at the intersection portion, the second impact absorbing member is disposed between the exterior material and the first impact absorbing member, at a portion excluding both of the end portion regions in the vehicle height direction, both of the end portion regions in the vehicle length direction, and the intersection portion, bending rigidity in a vehicle width direction of a cross section perpendicular to an extending direction of the first impact absorbing member is larger than bending rigidity in the vehicle width direction of a cross section perpendicular to an extending direction of the second impact absorbing member, the belt line reinforcement supports a window-side end portion of the first impact absorbing member at a support portion, the belt line reinforcement is disposed on a vehicle interior side of the first impact absorbing member, and bending rigidity in the vehicle width direction of a cross section perpendicular to an extending direction of the belt line reinforcement at the support portion is larger than bending rigidity in the vehicle width direction of the cross section perpendicular to the extending direction of the first impact absorbing member at the intersection portion.

(2) In the automobile door according to the above (1), at the intersection portion between the first impact absorbing member and the second impact absorbing member, a thickness in the vehicle width direction of the first impact absorbing member and/or the second impact absorbing member may be reduced.

(3) In the automobile door according to the above (1), at the intersection portion, the bending rigidity in the vehicle width direction of the cross section perpendicular to the extending direction of the first impact absorbing member may be larger than the bending rigidity in the vehicle width direction of the cross section perpendicular to the extending direction of the second impact absorbing member.

(4) In the automobile door according to any one of the above (1) to (3), the second impact absorbing member may be joined to the first impact absorbing member.

(5) In the automobile door according to any one of the above (1) to (4), in the cross section perpendicular to the extending direction of the first impact absorbing member, a width in the vehicle width direction may be equal to or larger than a width in the vehicle length direction.

(6) In the automobile door according to any one of the above (1) to (5), in the cross section perpendicular to the extending direction of the second impact absorbing member, a width in the vehicle width direction may be equal to or larger than a width in the vehicle height direction.

Effects of the Invention

As described above, according to the present invention, it is possible to provide an automobile door capable of more reliably absorbing an impact.

EMBODIMENTS OF THE INVENTION

Hereinafter, a preferred embodiment of the present invention will be described in detail with reference to the accompanying drawings. In this specification and the drawings, constituent elements having substantially the same functional configuration are denoted by the same reference numerals, whereby overlapping description is omitted.

In recent years, application of a high tensile strength steel sheet to an automobile exterior has been studied. If the high tensile strength steel sheet is applied, the sheet thickness of the steel sheet becomes thin, and thus a reduction in the weight of an exterior material of the automobile can be attained. For example, if the high tensile strength steel sheet is applied to an exterior material having a conventional sheet thickness of 0.7 mm, it is expected that even if the sheet thickness is 0.4 mm, dent resistance equivalent to that in the conventional sheet thickness of 0.7 mm can be obtained. However, since the panel stiffness of the exterior material depends on the sheet thickness, if the sheet thickness is reduced, the panel stiffness becomes insufficient. In other words, if the sheet thickness is reduced, the exterior material is easily deformed in a case where the exterior material is pushed by the hand. On the other hand, in PCT International Publication No. WO2018/021422, the inventors of the present invention disclosed impact absorbing members disposed lengthwise and breadthwise inside an exterior panel, and attained a reduction in weight without reducing the panel stiffness or the impact resistance performance even if the sheet thickness of the exterior material is reduced. In this regard, the present application is to achieve a further reduction in the weight of the exterior material of the automobile.

Figure 1:
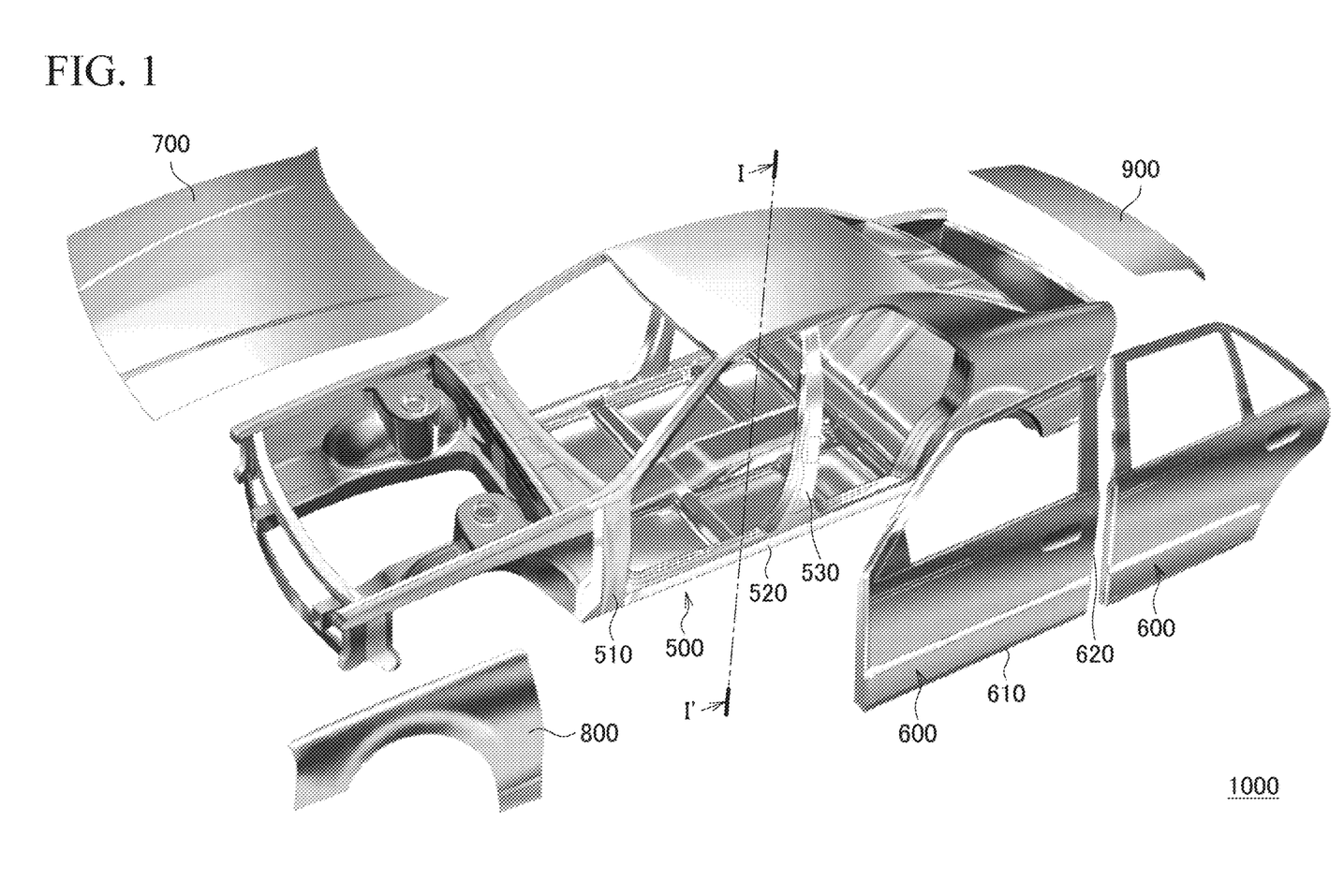
FIG. 1 is a perspective view showing a structure of an automobile according to an embodiment of the present invention.

FIG. 1 is a perspective view showing the structure of an automobile 1000 according to an embodiment of the present invention. As shown in FIG. 1, the automobile 1000 is provided with constituent elements such as a body 500, a door 600 (a front door and/or a rear door), a bonnet 700, a fender 800, and a trunk lid 900. In the present embodiment, the automobile 1000, in particular, the structure in the vicinity of the door 600, will be described. The present invention can be applied to not only a door that is mounted to a vehicle body through a hinge but also a sliding door.

Usually, the door 600 and the body 500 are connected such that the door 600 can rotate with respect to the body 500, through a door hinge provided at an A pillar 510 (also referred to as a front pillar) of the body 500 (or a door hinge provided at a B pillar 530).

Figure 2:
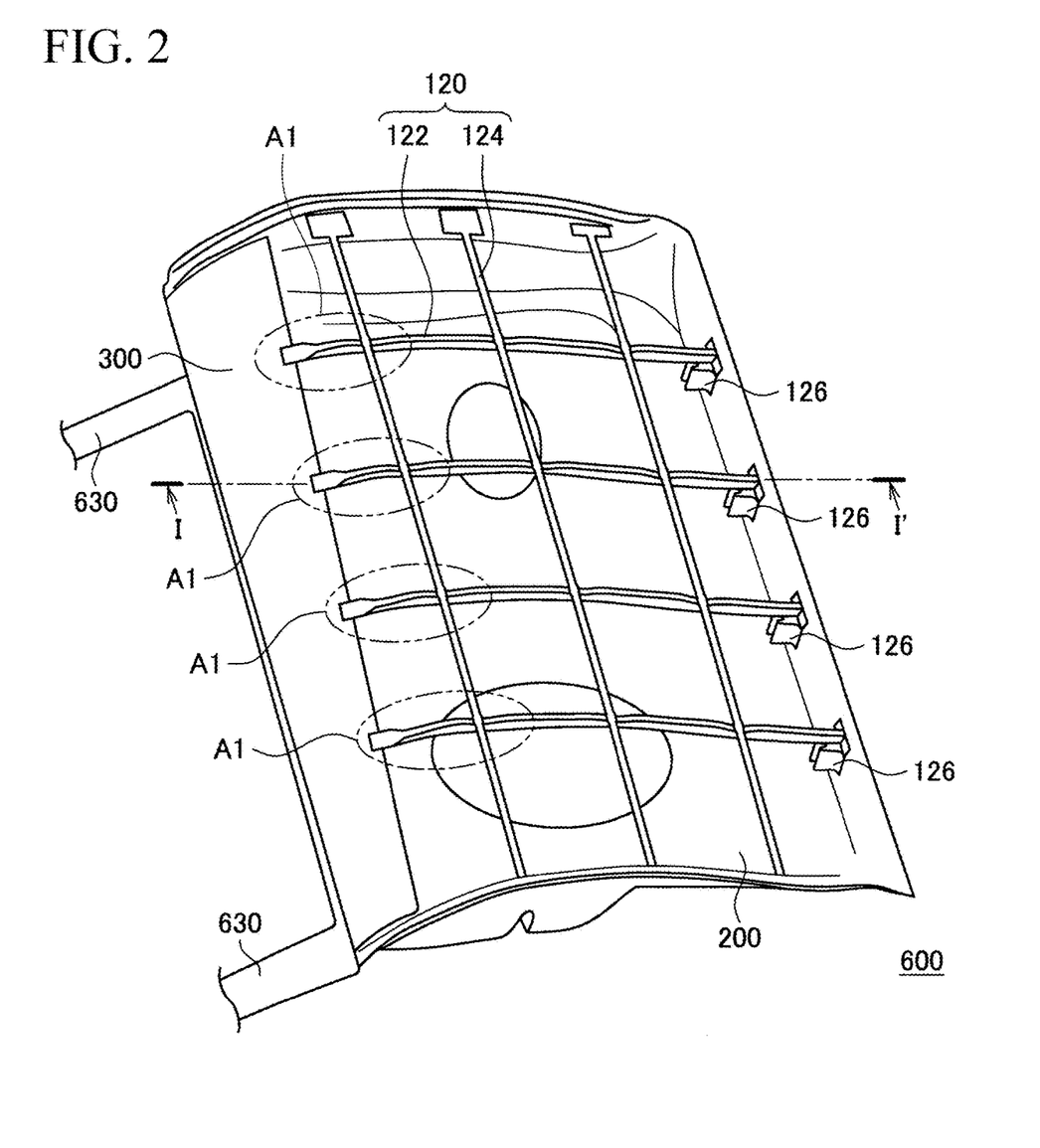
FIG. 2 is a schematic diagram showing a structure of a door according to the present embodiment.
Figure 3:
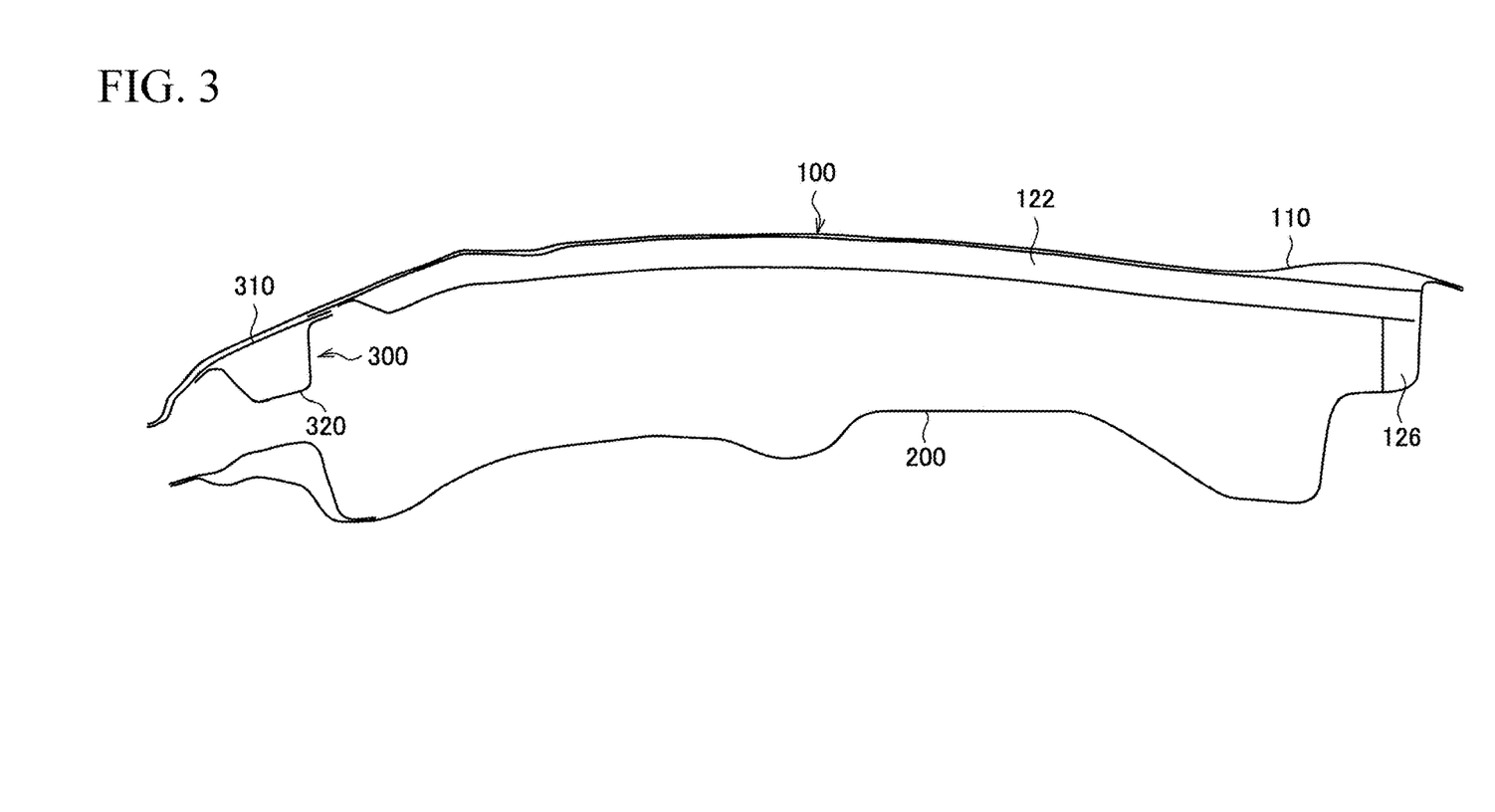
FIG. 3 is a schematic diagram showing a cross section along a one-dot chain line I-I' shown in FIG. 2.

FIG. 2 is a schematic diagram showing the structure of the door 600 and shows a state where the door 600 is viewed from the outside of the automobile 1000. For convenience of description, in FIG. 2, only an impact absorbing member 120 of an exterior panel 100 (described later) is shown, and an exterior material 110 is not shown. Further, FIG. 3 is a schematic diagram showing a cross section along a one-dot chain line I-I' shown in FIG. 2. The position of the one-dot chain line I-I' shown in FIG. 2 corresponds to the position of the one-dot chain line I-I' shown in FIG. 1.

In a case where the door 600 is a door (front door) on the front seat side of the automobile, in a state where it is closed with respect to the body 500, a lower end portion 610 thereof is adjacent to a side sill 520 of the body 500 with a side panel interposed therebetween, and an end portion 620 on the rear side of the door 600 on the front seat side of the automobile is adjacent to the B pillar 530 (also referred to as a center pillar) of the body 500 with a side panel interposed therebetween. The A pillar 510 and the B pillar 530 are also collectively referred to as a pillar.

As shown in FIG. 3, the door 600 is provided with the exterior panel 100. The exterior panel 100 is a panel whose front side is exposed to the outside of the automobile 1000. The surface on the front side of the exterior panel 100 is painted according to the color of the automobile 1000.

The exterior panel 100 includes the exterior material 110 and the impact absorbing member 120. The exterior material 110 is made of a steel sheet having a thickness in a range of about 0.4 to 0.7 mm, as an example. As an example, the exterior material 110 is curved such that the front side thereof is convex. That is, the exterior material 110 is curved in a cross section perpendicular to a vehicle length direction.

Figure 4:
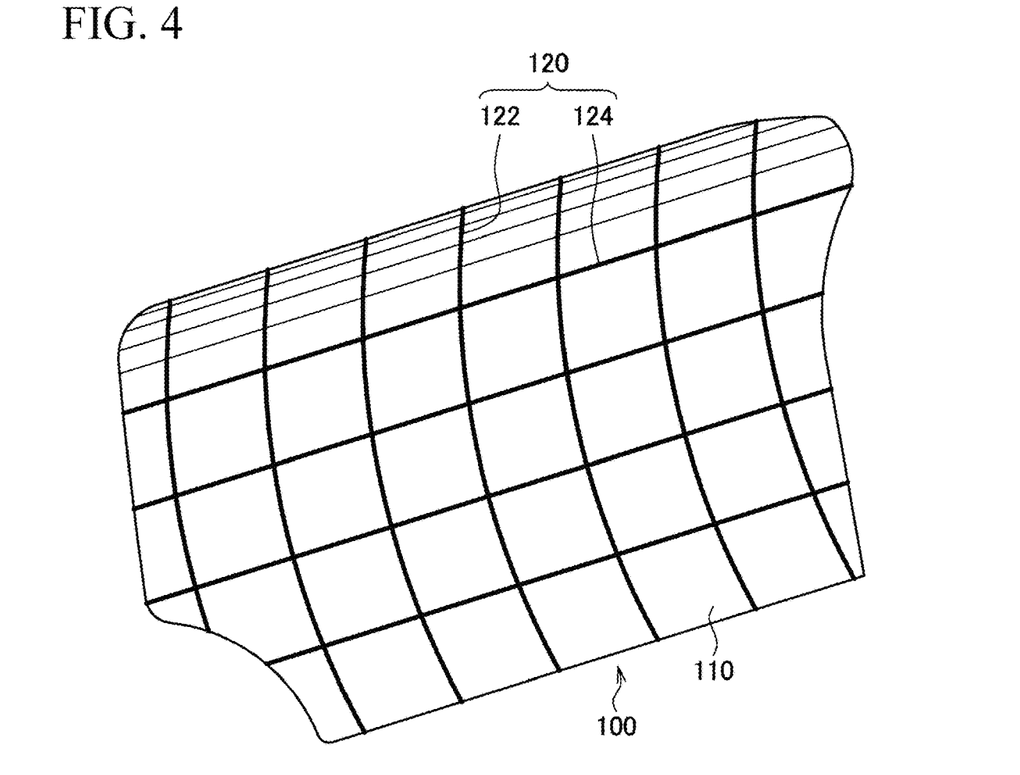
FIG. 4 is a schematic diagram showing a state where an exterior panel according to the present embodiment is viewed from the back side (the inside of the automobile).

FIG. 4 is a schematic diagram showing a state where the exterior panel 100 is viewed from the back side (the inside of the automobile). The impact absorbing member 120 includes a first impact absorbing member 122 disposed to traverse the exterior panel 100 so as to extend between both end portion regions in a vehicle height direction in the exterior panel 100, and a second impact absorbing member 124 disposed to traverse the exterior panel 100 so as to extend between both end portion regions in the vehicle length direction in the exterior panel 100.

Here, the "both end portion regions in the vehicle height direction in the exterior panel 100" mean regions each extending up to 20% inward from each of both end portions in the vehicle height direction of the exterior panel 100.

Further, the "both end portion regions in the vehicle length direction in the exterior panel 100" mean regions each extending up to 10% inward from each of both end portions in the vehicle length direction of the exterior panel 100.

It is desirable that the first impact absorbing member 122 is curved to follow the shape of the exterior material 110. The second impact absorbing member 124 extends substantially linearly and parallel to the vehicle length direction. However, in a case where the exterior material 110 is curved in a cross section perpendicular to the vehicle height direction, it is desirable that the second impact absorbing member 124 has a shape following the curved shape of the exterior material 110. This is because, if the first impact absorbing member 122 and the second impact absorbing member 124 have shapes following the exterior material 110, the first impact absorbing member 122 and the second impact absorbing member 124 can be in close contact with the exterior material 110 and be preferably joined (bonded) to the exterior material 110. If the first impact absorbing member 122 or the second impact absorbing member 124 is joined to the exterior material 110, when the first impact absorbing member 122 or the second impact absorbing member 124 is deformed, the exterior material 110 resists deformation. That is, because the exterior material 110 can contribute to impact absorption, it is more preferable.

A door inner panel 200 is provided inside the exterior panel 100. As an example, the door inner panel 200 is made of a steel sheet. The further inner side of the door inner panel 200 faces the vehicle interior, and is usually provided with an interior material made of leather or a resin material. A third impact absorbing member 126 is interposed between the first impact absorbing member 122 and the door inner panel 200 in a vehicle width direction.

Figure 5:
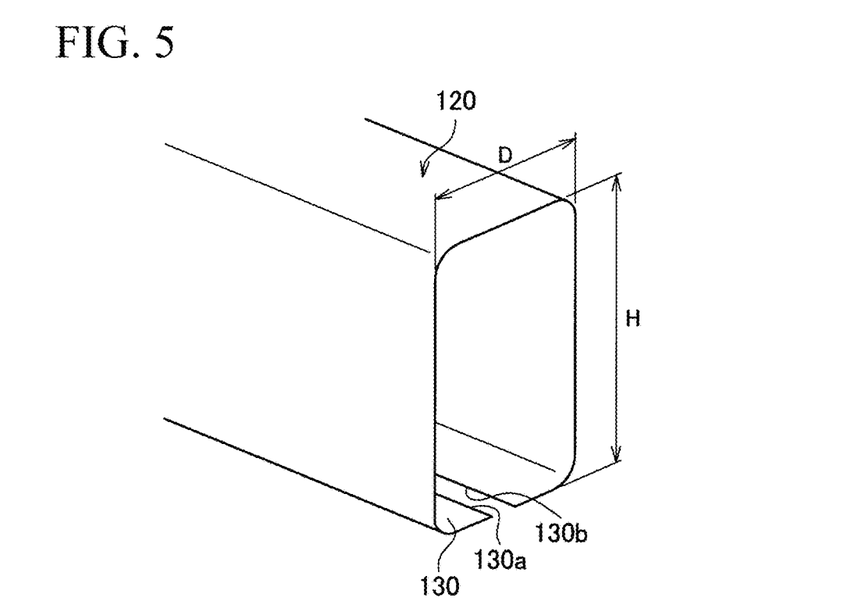
FIG. 5 is a schematic perspective view showing an example of a configuration of an impact absorbing member according to the present embodiment.

FIG. 5 is a perspective view showing an example of the configuration of the impact absorbing member 120. The basic configurations of the first impact absorbing member 122 and the second impact absorbing member 124 can be the same. FIG. 5 also shows a cross-sectional configuration orthogonal to a longitudinal direction of the impact absorbing member 120. In the example shown in FIG. 5, the impact absorbing member 120 has a hollow rectangular (oblong) cross section. The impact absorbing member 120 is manufactured by bending a sheet material 130. Further, the impact absorbing member 120 may be manufactured with a hollow tubular member or a solid rod-shaped member. Further, the impact absorbing member 120 may have a hollow or solid trapezoidal cross section. Further, it is preferable that in the cross section of the first impact absorbing member 122 disposed in the vehicle height direction, the width in the vehicle width direction is equal to or larger than the width in the vehicle length direction, and in the cross section of the second impact absorbing member 124 disposed in the vehicle length direction, the width in the vehicle width direction is equal to or larger than the width in the vehicle height direction. In the example shown in FIG. 5, the impact absorbing member 120 has an oblong cross-sectional shape, and one side thereof has a long side H in a range of about 6 to 20 mm and a short side D in a range of about 6 to 16 mm. Further, the sheet thickness of the sheet material 130 forming the impact absorbing member 120 is in a range of about 0.6 to 1.2 mm, as an example. As the sheet material 130, a steel sheet can be used. The tensile strength of the first impact absorbing member 122 and the second impact absorbing member 124 is preferably 980 MPa or more, and more preferably 1470 MPa or more. Further, in a case where the first impact absorbing member 122 and the second impact absorbing member 124 are formed from a steel sheet by press forming, cold forming may be used, or hot stamping may be adopted depending on the strength of the steel sheet.

As shown in FIG. 5, a predetermined gap may be provided between an end portion 130a and an end portion 130b of the bent sheet material 130. On the other hand, the end portion 130a and the end portion 130b may be in close contact with each other. Further, the end portion 130a and the end portion 130b may be joined to each other by welding, bonding, or the like. The cross section of the impact absorbing member 120 does not need to have a continuous rectangular shape, annular shape, or trapezoidal shape, and may have a discontinuous shape due to the presence of a gap. Further, in a case where end portions are present in the cross section of the impact absorbing member 120, the end portions may be in close contact with each other, or the end portions may be joined to each other by welding, bonding, or the like.

The impact absorbing member 120 is disposed such that the surface on which the end portions 130a and 130b are located or the surface opposite to the surface on which the end portions 130a and 130b are located is in close contact with the exterior material 110. Preferably, the surface on which the end portions 130a and 130b are located or the surface opposite to the surface on which the end portions 130a and 130b are located is joined to the exterior material 110.

As shown in FIG. 2, the door 600 is provided with a window frame 630. The end portion on the window frame 630 side of the first impact absorbing member 122 is supported by a belt line reinforcement 300. That is, the end portion on the upper side of the first impact absorbing member 122 extending in the vehicle height direction is connected to the belt line reinforcement 300. The end portion on the window frame 630 side of the first impact absorbing member 122 is disposed on the vehicle exterior side of the belt line reinforcement 300.

In the present embodiment, the belt line reinforcement 300 has a function as a collision-resistant member that absorbs a load that is generated due to a collision or the like. A general belt line reinforcement is provided on one or both of the vehicle interior side and the vehicle exterior side with the position of a window glass as a boundary, in the vicinity of the window frame of the door. At this time, in general, a belt line reinforcement having high material strength or bending rigidity is provided as a collision-resistant member on the vehicle interior side where it is easy to secure a space, and a belt line reinforcement having relatively low strength is provided on the vehicle exterior side in order to reinforce an opening portion in which the window glass enters and exits.

More specifically, in general, as the belt line reinforcement, there are a belt line inner reinforcement that is disposed on the vehicle interior side of the window glass and a belt line outer reinforcement that is disposed on the vehicle exterior side of the window glass. As the belt line inner reinforcement, a member having high strength or rigidity (for example, a pipe or the like) is used for occupant protection. Further, the belt line outer reinforcement is provided in order to reinforce the opening portion which is a lifting and lowering opening in which the window glass enters and exits. For a reduction in weight, as the belt line outer reinforcement, a member having high rigidity is not used and for example, a metal sheet having a sheet thickness of about 0.6 mm is often used. Further, it is difficult to integrate the belt line inner reinforcement and the belt line outer reinforcement because the opening portion in which the window glass enters and exits cannot be reinforced.

The belt line reinforcement 300 according to the present embodiment corresponds to the belt line outer reinforcement because it supports the first impact absorbing member 122 in the vehicle height direction, which is disposed on the vehicle exterior side of the window glass. Then, in the present embodiment, a belt line reinforcement having relatively high strength, which is disposed inside the window glass of the door 600 in the related art, is disposed on the vehicle exterior side of the window glass of the door 600, thereby increasing the collision resistance performance in the vicinity of the window frame 630 of the door 600. In other words, the belt line reinforcement 300 according to the present embodiment functions as an impact absorbing member that absorbs an impact at the time of a collision, unlike a belt line reinforcement in the related art, which is disposed on the vehicle exterior side of the window glass of the door 600 and only aims to reinforce the opening portion.

Then, in the present embodiment, by connecting the end portion on the upper side of the first impact absorbing member 122 extending in the vehicle height direction to the belt line reinforcement 300 and connecting the end portion on the window frame 630 side of the first impact absorbing member 122 to the vehicle exterior side of the belt line reinforcement 300, the load that is applied from the outside of the door 600 is supported by the belt line reinforcement 300.

Further, by causing the first impact absorbing member 122 to intersect with the second impact absorbing member 124 extending in the vehicle length direction, the collision resistance performance of the door 600 as a whole is increased. Hereinafter, the impact absorbing function by the belt line reinforcement 300, the first impact absorbing member 122, and the second impact absorbing member 124 will be described in detail.

As shown in FIG. 3, the belt line reinforcement 300 is made of a sheet metal 310 having a shape along the exterior material 110, and a hat channel material 320 provided on the vehicle interior side of the sheet metal 310. The hat channel material 320 is joined to the sheet metal 310, whereby the belt line reinforcement 300 has a tubular shape having an axis in the vehicle length direction and the bending rigidity against the load from the outside of the door 600 is increased.

The belt line reinforcement 300 according to the present embodiment is disposed in a narrow space in the door 600, and requires high bending rigidity. Therefore, it is desirable that the belt line reinforcement 300 is made of a closed cross section member as shown in FIG. 3, a solid material, a sheet material having a thicker sheet thickness than other members, a member in which a closed cross section member is filled with a filler, or the like. The cross-sectional shape of the belt line reinforcement 300 shown in FIG. 3 is an example, and the cross-sectional shape of the belt line reinforcement 300 may be other shapes. Further, the belt line reinforcement 300 may be made of only the sheet metal 310 as long as the bending rigidity can be secured. As the material of the belt line reinforcement 300, various materials such as a steel sheet, stainless steel, aluminum, an aluminum alloy, and CFRP (carbon fiber reinforced plastic) can be used.

Figure 6:
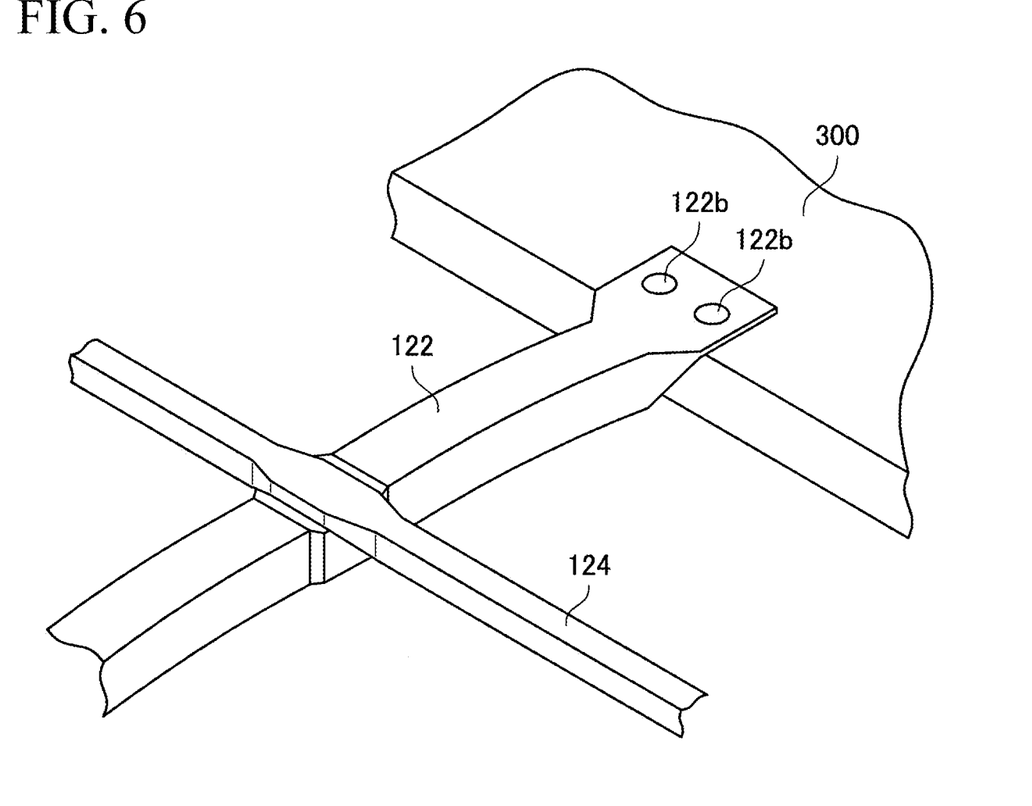
FIG. 6 is a schematic perspective view showing a portion where a first impact absorbing member and a belt line reinforcement are connected according to the present embodiment.

FIG. 6 is a schematic diagram showing a portion where the first impact absorbing member 122 and the belt line reinforcement 300 are connected, and shows an area A1 surrounded by a two-dot chain line in FIG. 2. FIG. 6 shows a state where the belt line reinforcement 300, the first impact absorbing member 122, and the second impact absorbing member 124 are viewed from the outside (the exterior material 110 side) of the vehicle, and the exterior material 110 and the door inner panel 200 are not shown.

As shown in FIG. 6, the end on the upper side in the vehicle height direction of the first impact absorbing member 122 is located on the outside of the belt line reinforcement 300 and overlaps the belt line reinforcement 300. Then, at the portion where the first impact absorbing member 122 and the belt line reinforcement 300 overlap, the first impact absorbing member 122 is joined to the belt line reinforcement 300 at a joint portion 122*b*. In other words, the first impact absorbing member 122 is joined to the belt line reinforcement 300 from the vehicle exterior side.

According to such a configuration, when the door 600 collides, the load due to the impact that is applied to the first impact absorbing member 122 is applied to the belt line reinforcement 300 from the vehicle exterior side toward the vehicle interior side. Since the first impact absorbing member 122 overlaps the belt line reinforcement 300 from the outside, the load can be reliably transmitted to the belt line reinforcement 300, and the load can be supported by the belt line reinforcement 300.

As described above, the load due to a collision is transmitted from the first impact absorbing member 122 to the belt line reinforcement 300. Next, a configuration for transmitting the load due to a collision from the second impact absorbing member 124 to the first impact absorbing member 122 will be described.

Figure 7:
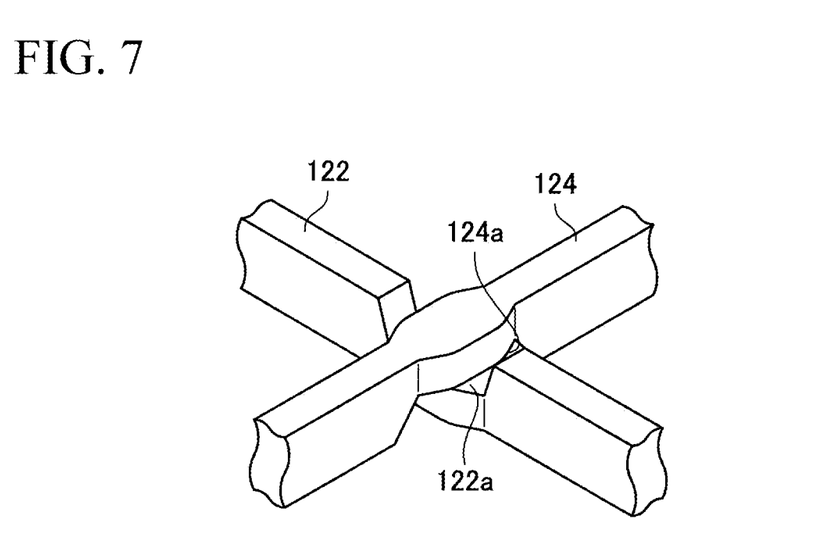
FIG. 7 is a schematic perspective view showing in detail an example of an intersection portion between the first impact absorbing member and a second impact absorbing member according to the present embodiment.

The second impact absorbing member 124 extending in the vehicle length direction and the first impact absorbing member 122 extending in the vehicle height direction intersect with each other at an intersection portion. At the intersection portion, the first impact absorbing member 122 and the second impact absorbing member 124 are in contact with each other. Here, the expression "contact" includes not only direct contact but also joining through an adhesive such as mastic. FIG. 7 is a perspective view schematically showing an example of the intersection portion between the first impact absorbing member 122 and the second impact absorbing member 124. FIG. 7 schematically shows a state where the first impact absorbing member 122 and the second impact absorbing member 124 are viewed from the outside (the exterior material 110 side) of the vehicle. At the intersection portion, the second impact absorbing member 124 is located in the direction of the outside (on the exterior material 110 side) of the vehicle with respect to the first impact absorbing member 122. As shown in FIG. 7, the first impact absorbing member 122 may be provided with a recessed part 122*a*, and the second impact absorbing member 124 may be provided with a recessed part 124*a*. In other words, at the intersection portion between the first impact absorbing member 122 and the second impact absorbing member 124, the thickness in the vehicle width direction of the first impact absorbing member 122 and/or the second impact absorbing member 124 may be reduced. In this way, the first impact absorbing member 122 and the second impact absorbing member 124 are disposed in the same plane.

The second impact absorbing member 124 is located in the direction of the outside (on the exterior material 110 side) of the vehicle with respect to the first impact absorbing member 122, whereby in a case where another structure collides with the exterior panel 100 of the door 600, the load is transmitted from the exterior material 110 to the second impact absorbing member 124. Then, the second impact absorbing member 124 is disposed in the vehicle length direction, and one second impact absorbing member 124 intersects with the plurality of the first impact absorbing members 122 at a plurality of intersection portions. Therefore, the load that is applied to one second impact absorbing member 124 is transmitted from the plurality of intersection portions to the plurality of the first impact absorbing members 122. Then, the plurality of the first impact absorbing members 122 are disposed in the vehicle height direction, and the end portion on the window frame 630 side of the door 600 is supported by the belt line reinforcement 300. Therefore, the load is dispersed to the belt line reinforcement 300. The belt line reinforcement 300 is an impact absorbing member, has high collision resistance performance, and also has high bending rigidity. Therefore, the belt line reinforcement 300 can receive the load due to the collision and can more reliably absorb the impact. In particular, the belt line reinforcement 300 extends not only in the range of the lifting and lowering opening of the window glass of the door 600 but also over the entire length of the door 600, as shown in FIG. 2, and both ends in the vehicle length direction of the belt line reinforcement 300 are installed so as to be able to transmit the load to the A pillar 510 side and the B pillar 530 side. Therefore, the load due to the collision can be more reliably absorbed.

Here, the bending resistance of a member can be defined with the bending rigidity (longitudinal elastic coefficient× second moment of a cross section) of the member. In the present embodiment, the magnitude relationship of the bending rigidity of the first impact absorbing member 122, the second impact absorbing member 124, and the belt line reinforcement 300 is optimally adjusted, and the bending rigidity is increased in the order of the second impact absorbing member 124, the first impact absorbing member 122, and the belt line reinforcement 300, whereby the impact absorbing performance of the door 600 is significantly improved. Hereinafter, the bending rigidity of the first impact absorbing member 122, the second impact absorbing member 124, and the belt line reinforcement 300 according to the present embodiment will be described in detail.

As described above, the second impact absorbing member 124 in the vehicle length direction has a function of transmitting an impact load to the first impact absorbing member 122 in the vehicle height direction. Then, the impact load is mainly absorbed by the first impact absorbing member 122 in the vehicle height direction. First, at a portion excluding both end portion regions in the vehicle height direction, both end portion regions in the vehicle length direction, and the intersection portion, the bending rigidity (around the axis in the vehicle length direction) in the vehicle width direction of the cross section of the first impact absorbing member 122 extending in the vehicle height direction is larger than the bending rigidity (around the axis in the vehicle height direction) in the vehicle width direction of the cross section of the second impact absorbing member 124 extending in the vehicle length direction. In particular, the bending rigidity in the vehicle width direction of the cross section of the first impact absorbing member 122 is preferably 1.5 times or more, more preferably 5 times or more, and further preferably 10 times or more larger than the bending rigidity in the vehicle width direction of the cross section of the second impact absorbing member 124.

Further, it is preferable that also at the intersection portion, the bending rigidity in the vehicle width direction of the cross section of the first impact absorbing member 122 is larger than the bending rigidity in the vehicle width direction of the cross section of the second impact absorbing member 124. Also in this case, as in the above, it is preferably 1.5 times or more larger, and further preferably 10 times or more larger.

Further, the bending rigidity in the vehicle width direction of the cross section of the first impact absorbing member 122 at the intersection portion may be larger than the bending rigidity in the vehicle width direction of the cross section of the second impact absorbing member 124 at the portion excluding both end portion regions in the vehicle length direction and the intersection portion. Also in this case, as in the above, it may be 1.5 times or more larger, and may be 5 times or more larger.

The cross section means a cross section perpendicular to the extending direction of the impact absorbing member.

The reason why the bending rigidity of the first impact absorbing member 122 is made larger than that of the second impact absorbing member 124 is as follows. In many cases, the door 600 of the automobile is configured such that the length in the vehicle length direction is longer when the lengths in the vehicle length direction and the vehicle height direction are compared. In the impact absorbing members having the same cross-sectional shape, in a case where both end portions thereof are supported, the longer member is more easily deformed when a load is applied to the center. Therefore, when the second impact absorbing member 124 that traverses in the vehicle length direction and the first impact absorbing member 122 that traverses in the vehicle height direction are compared, in the case of the same cross-sectional shape, the first impact absorbing member 122 that traverses in the vehicle height direction is stronger. Further, in the exterior material 110 of the door 600 of the automobile, when the shape in the vehicle length direction and the shape in the vehicle height direction are compared, in many cases, the shape in the vehicle height direction of the cross section perpendicular to the vehicle length direction has large curvature in which the outside in the vehicle width direction is convex. Considering a case where the impact absorbing member 120 has a shape along the exterior material 110, in a case where the impact absorbing member 120 receives a load toward the inside in the vehicle width direction, that is, in a case where a collision load is received by the side surface of the automobile 1000, the axial force of compression acts on the first impact absorbing member 122 having large curvature in which the outside in the vehicle width direction is convex. Therefore, the deformation toward the inside in the vehicle width direction is further suppressed. That is, the first impact absorbing member 122 can withstand a larger load than the second impact absorbing member 124. In other words, the first impact absorbing member 122 extending in the vehicle height direction has higher impact absorbing performance. Therefore, in order to more efficiently improve the impact absorbing performance of the door 600, it is better to make the bending rigidity of the first impact absorbing member 122 larger than that of the second impact absorbing member 124.

In order to transmit the impact load applied to the second impact absorbing member 124 in the vehicle length direction to the first impact absorbing member 122 in the vehicle height direction, the second impact absorbing member 124 in the vehicle length direction is disposed on the vehicle exterior side (the exterior material side) of the first impact absorbing member 122 in the vehicle height direction. At this time, since the main role of the second impact absorbing member 124 is to transmit a load to the first impact absorbing member 122, the influence of a reduction in the bending rigidity of the second impact absorbing member 124 on the impact absorbing performance of the door 600 is smaller than the influence of a reduction in the bending rigidity of the first impact absorbing member 122. Since the bending rigidity is reduced in a case where the cross section of the impact absorbing member 120 is reduced or the sheet thickness of the constituent sheet material is reduced, the bending rigidity of the first impact absorbing member 122 is set to be relatively large and the bending rigidity of the second impact absorbing member 124 is set to be relatively small, whereby it becomes possible to efficiently improve the impact absorbing performance of the door 600 without an excessive increase in weight.

In a case where the bending rigidity in the vehicle width direction of the cross section of the second impact absorbing member 124 is larger than the bending rigidity in the vehicle width direction of the cross section of the first impact absorbing member 122, the weight of the second impact absorbing member 124 becomes larger than necessary, which does not meet the purpose of reducing the weight of the door 600 intended in the present embodiment.

Next, the bending rigidity of the first impact absorbing member 122 and the bending rigidity of the belt line reinforcement 300 will be described. As described above, the end portion on the window frame 630 side of the first impact absorbing member 122 in the vehicle height direction is supported by the belt line reinforcement 300. At or in the vicinity of the point (support portion) where the belt line reinforcement 300 supports the end portion of the first impact absorbing member 122, the bending rigidity in the vehicle width direction of the cross section of the belt line reinforcement 300 is larger than the bending rigidity in the vehicle width direction of the cross section of the first impact absorbing member 122. In particular, the bending rigidity in the vehicle width direction of the cross section of the belt line reinforcement 300 is preferably twice or more, more preferably 10 times or more, and further preferable 20 times or more larger than the bending rigidity in the vehicle width direction of the cross section of the first impact absorbing member 122.

As described above, the first impact absorbing member 122 overlaps the belt line reinforcement 300 from the outside, and the load that is applied from the first impact absorbing member 122 is supported by the support portion of the belt line reinforcement 300. The load due to an impact is transmitted from the second impact absorbing member 124 to the first impact absorbing member 122 and is finally received by the belt line reinforcement 300. Therefore, the bending rigidity in the vehicle width direction of the cross section of the belt line reinforcement 300 is made larger than the bending rigidity in the vehicle width direction of the cross section of the first impact absorbing member 122, whereby the load can be more reliably received by the belt line reinforcement 300.

In a case where the bending rigidity in the vehicle width direction of the cross section of the first impact absorbing member 122 is larger than the bending rigidity in the vehicle width direction of the cross section of the belt line reinforcement 300, since the belt line reinforcement 300 is deformed before the first impact absorbing member 122 in the vehicle height direction sufficiently absorbs the impact load, the purpose of the impact absorption according to the present embodiment is not met. Further, in this case, since the weight of the first impact absorbing member 122 in the vehicle height direction becomes larger than necessary, the purpose of reducing the weight of the door 600 intended in the present embodiment is not met. The comparison of the bending rigidity of the first impact absorbing member 122 with the bending rigidity of the belt line reinforcement 300 is the comparison of the bending rigidity in the vehicle width direction of the cross section at the intersection portion between the first impact absorbing member 122 with the bending rigidity in the vehicle width direction of the cross section of the support portion of the first impact absorbing member 122 of the belt line reinforcement 300. There is a case where the first impact absorbing member 122 does not have a uniform cross-sectional shape in the longitudinal direction. In a case where the recessed parts 122*a* and 124*a* are provided in the first impact absorbing member 122 and the second impact absorbing member 124 in order to cause the first impact absorbing member 122 and the second impact absorbing member 124 to be disposed in the same plane particularly at the intersection portion, as described above, since the thickness in the vehicle width direction is reduced at each of the recessed parts 122*a* and 124*a*, there is a case where the bending rigidity in the vehicle width direction of the cross sections of the first impact absorbing member 122 and the second impact absorbing member 124 becomes smaller than those in the points other than the intersection portion. Therefore, the bending rigidity of the first impact absorbing member 122 for comparison with the bending rigidity of the belt line reinforcement 300 is set to be the bending rigidity in the vehicle width direction of the cross section at the intersection portion where there is a possibility that the bending rigidity in the first impact absorbing member 122 may become small compared to the bending rigidity in other points.

Figure 8:
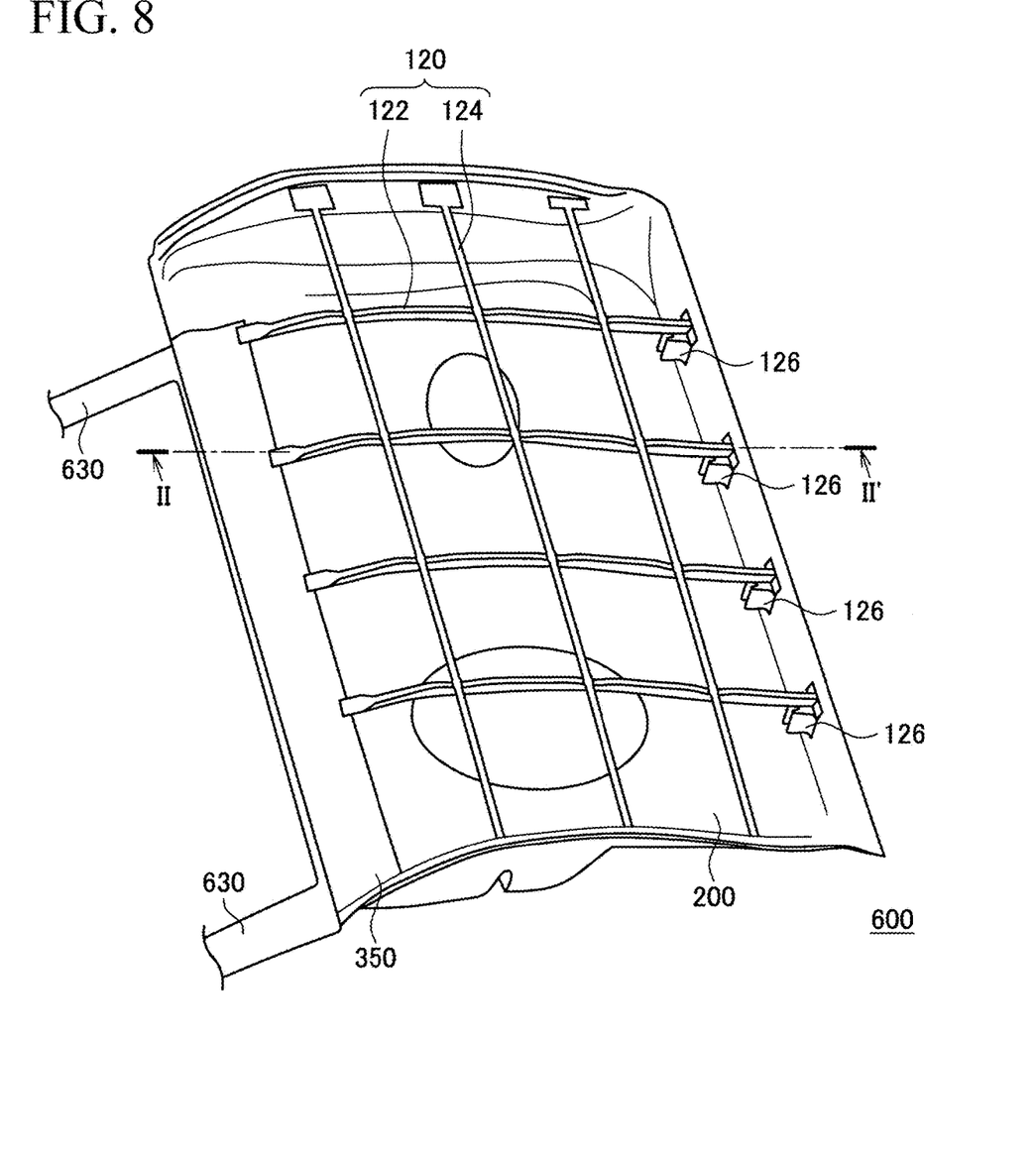
FIG. 8 is a schematic diagram showing a structure of a door according to a comparative example.
Figure 9:
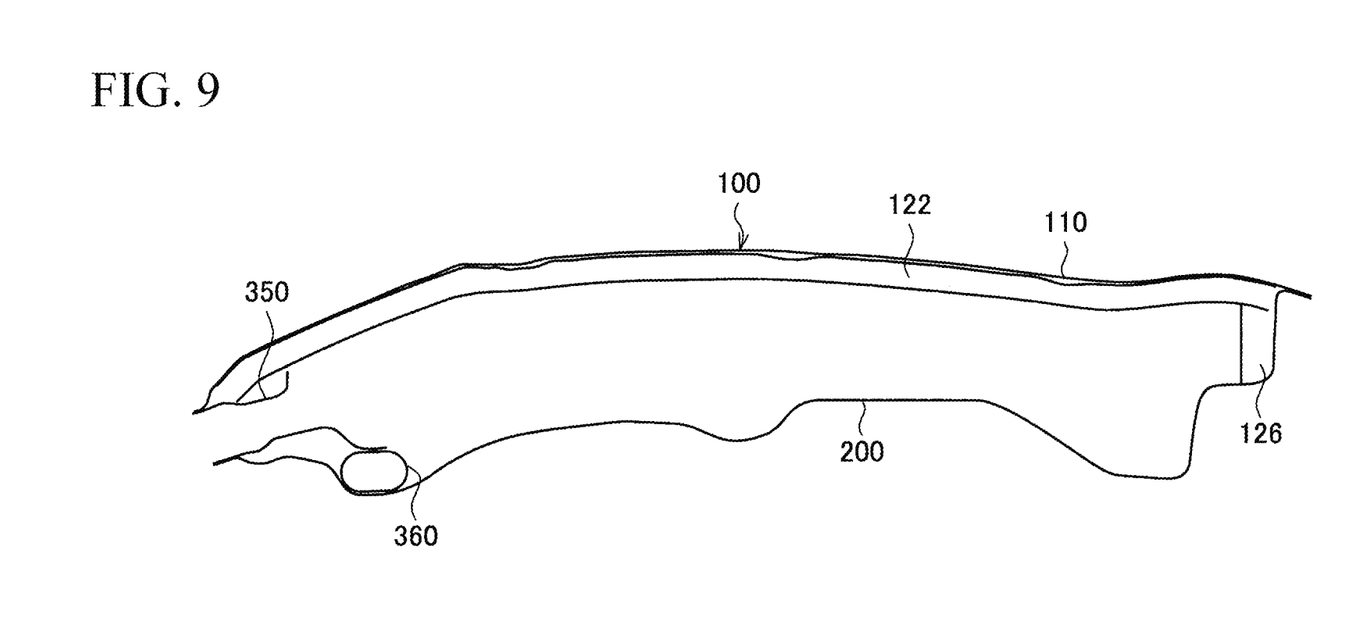
FIG. 9 is a schematic diagram showing a cross section along a one-dot chain line II-II' shown in FIG. 8.

Next, a comparative example of the above-described embodiment of the present invention will be described based on FIGS. 8 and 9. FIG. 8 is a schematic diagram showing the structure of the door 600 according to the comparative example, and shows a state where the door 600 is viewed from the outside of the automobile 1000, as in FIG. 2. Further, FIG. 9 is a schematic diagram showing a cross section along a one-dot chain line II-II' shown in FIG. 8. The position of the one-dot chain line II-II' shown in FIG. 8 corresponds to the position of the one-dot chain line I-I' shown in FIG. 1.

The comparative example shown in FIGS. 8 and 9 corresponds to a configuration which includes a belt line inner reinforcement 360 that is disposed on the vehicle interior side of the window glass and a belt line outer reinforcement 350 that is disposed on the vehicle exterior side of the window glass. As described above, the belt line outer reinforcement 350 is provided to reinforce the opening portion which is the lifting and lowering opening in which the window glass enters and exits, and is made of a metal sheet. Since the belt line outer reinforcement 350 is responsible for only the reinforcement of the opening portion, it is not a member having collision resistance performance and high material strength or bending rigidity. Further, since the belt line outer reinforcement 350 is responsible for only the reinforcement of the opening portion, it is not disposed over the entire length of the door 600, as shown in FIG. 8, and is disposed only in the range of the lifting and lowering opening for the window glass. That is, since both ends in the vehicle length direction of the belt line outer reinforcement 350 are not installed so as to be able to transmit a load to the A pillar 510 side and the B pillar 530 side, the load due to a collision cannot be sufficiently absorbed. On the other hand, the belt line inner reinforcement 360 is a collision-resistant member and is made of a member having high material strength and bending rigidity. As shown in FIG. 9, the belt line inner reinforcement 360 is made of a tubular member extending in the vehicle length direction.

In the configuration of the comparative example shown in FIGS. 8 and 9, the first impact absorbing member 122 is connected to the belt line outer reinforcement 350.

In the configuration of the comparative example shown in FIGS. 8 and 9, the weight of the door 600 is regarded as being the same. The configuration of the present embodiment shown in FIGS. 2 and 3 and the configuration of the comparative example shown in FIGS. 8 and 9 are different from each other in that the belt line reinforcement 300 of the present embodiment is replaced by the belt line outer reinforcement 350 and the belt line inner reinforcement 360 of the comparative example and the first impact absorbing member 122 is connected to the belt line outer reinforcement 350, and the other configurations are basically the same including the weight.

Figure 10:
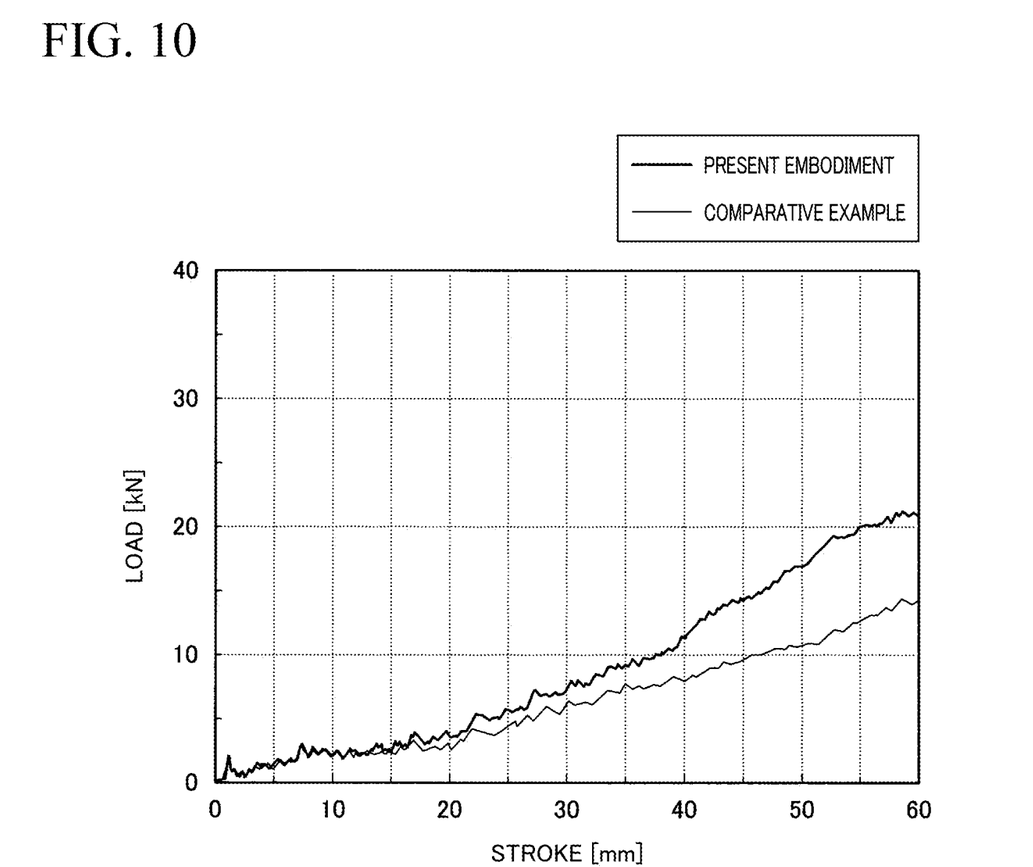
FIG. 10 is a characteristic diagram showing the relationship between the stroke of an indenter and a load that the indenter receives, in a case where an exterior panel of a door is pushed by the indenter, with respect to the configuration of the present embodiment shown in FIG. 2 and the configuration of the comparative example shown in FIG. 8.

FIG. 10 is a characteristic diagram in which assuming a case where the center of the exterior panel 100 of the door 600 is pushed by a columnar indenter having a radius of 20 mm and an axis in the vehicle height direction, the relationship between the stroke of the indenter and a load that the indenter receives from the door 600 is obtained by simulation, with respect to the configuration of the embodiment of the present invention shown in FIGS. 2 and 3 and the configuration of the comparative example shown in FIGS. 8 and 9. As shown in FIG. 10, in the case of the same stroke, a load characteristic is further improved in the present embodiment than in the comparative example, and the difference is remarkable at the stroke of 20 mm or more. As described above, the weights of the doors of the present embodiment and the comparative examples are the same. Therefore, according to the configuration of the present embodiment, it can be seen that the impact absorbing performance becomes significantly higher than that in the comparative example in which a reduction in weight equivalent to that in the present embodiment is achieved. Therefore, it can be understood that the impact absorbing performance can be significantly improved by the configuration of the present embodiment.

In the above description, the case is an exemplary example where each of the members such as the first impact absorbing member 122, the second impact absorbing member 124, the third impact absorbing member 126, and the door inner panel 200 is made of a steel sheet. However, these members may be made of other materials such as aluminum, an aluminum alloy, and CFRP (carbon fiber reinforced plastic).

As described above, according to the present embodiment, the configuration is made in which the belt line reinforcement 300 supports the window-side end portion of the first impact absorbing member 122 and the belt line reinforcement 300 is disposed on the vehicle interior side of the first impact absorbing member 122. Further, the bending rigidity in the vehicle width direction of the cross section of the belt line reinforcement 300 is made larger than the bending rigidity in the vehicle width direction of the cross section of the first impact absorbing member 122. In this way, in a case where a load is applied to the door 600, it becomes possible to more reliably support the load that is transmitted from the first impact absorbing member 122 to the belt line reinforcement 300.

Therefore, in a case where the high-strengthening and the thinning of the exterior material for the purpose of a reduction in weight are attained, it is possible to improve the panel stiffness of the exterior material and it becomes possible to ensure the impact resistance performance at the time of a collision.

The preferred embodiment of the present invention has been described in detail above with reference to the accompanying drawings. However, the present invention is not limited to such an example. It is clear that by a person having ordinary knowledge in the field of the technique to which the present invention belongs, various change examples or modification examples can be conceived within the scope of the technical idea of the present invention and it will be understood that these examples also naturally belong to the technical scope of the present invention.

The present invention can be applied to the front door or the rear door of an automobile. Further, the present invention can be applied to not only a door that is disposed at a side portion of an automobile but also a door (also referred to as a tailgate) that is disposed at a rear portion of an automobile. In a case where the present invention is applied to a door that is disposed at a rear portion of an automobile, an inner panel of such a door intersects with the vehicle length direction of the automobile. Therefore, the vehicle length direction described in the above embodiment may be read as a vehicle width direction and the vehicle width direction may be read as a vehicle length direction.

INDUSTRIAL APPLICABILITY

The present invention has high industrial applicability because it is possible to provide an automobile door capable of more reliably absorbing an impact.

BRIEF DESCRIPTION OF THE REFERENCE SYMBOLS

122: first impact absorbing member
124: second impact absorbing member
300: belt line reinforcement
520: side sill
600: door
1000: automobile

The invention claimed is:

1. An automobile door comprising:
a first impact absorbing member that traverses the automobile door so as to extend between both end portion regions in a vehicle height direction;
a second impact absorbing member that traverses the automobile door so as to extend between both end portion regions in a vehicle length direction;
an exterior material; and
a belt line reinforcement,
wherein the second impact absorbing member is adjacent to the exterior material,
the first impact absorbing member and the second impact absorbing member intersect with each other at an intersection portion,
the first impact absorbing member and the second impact absorbing member are in contact with each other at the intersection portion,
the second impact absorbing member is disposed between the exterior material and the first impact absorbing member,
at a portion excluding both of the end portion regions in the vehicle height direction, both of the end portion regions in the vehicle length direction, and the intersection portion, bending rigidity in a vehicle width direction of a cross section perpendicular to an extending direction of the first impact absorbing member is larger than bending rigidity in the vehicle width direction of a cross section perpendicular to an extending direction of the second impact absorbing member,
the belt line reinforcement supports a window-side end portion of the first impact absorbing member at a support portion,
the belt line reinforcement is disposed on a vehicle interior side of the first impact absorbing member, and
bending rigidity in the vehicle width direction of the cross section perpendicular to an extending direction of the belt line reinforcement at the support portion is larger than bending rigidity in the vehicle width direction of the cross section perpendicular to the extending direction of the first impact absorbing member at the intersection portion.

2. The automobile door according to claim 1, wherein at the intersection portion between the first impact absorbing member and the second impact absorbing member, a thickness in the vehicle width direction of the first impact absorbing member and/or the second impact absorbing member is reduced.

3. The automobile door according to claim 2, wherein at the intersection portion, the bending rigidity in the vehicle width direction of the cross section perpendicular to the extending direction of the first impact absorbing member is larger than the bending rigidity in the vehicle width direction of the cross section perpendicular to the extending direction of the second impact absorbing member.

4. The automobile door according to claim 1, wherein the second impact absorbing member is joined to the first impact absorbing member.

5. The automobile door according to claim 1, wherein in the cross section perpendicular to the extending direction of the first impact absorbing member, a width in the vehicle width direction is equal to or larger than a width in the vehicle length direction.

6. The automobile door according to claim 1, wherein in the cross section perpendicular to the extending direction of the second impact absorbing member, a width in the vehicle width direction is equal to or larger than a width in the vehicle height direction.

* * * * *